United States Patent [19]

Sunagawa et al.

[11] Patent Number: 5,757,410
[45] Date of Patent: May 26, 1998

[54] IMAGE-WISE EXPOSURE APPARATUS AND IMAGE DISPLAYING APPARATUS

[75] Inventors: Hiroshi Sunagawa; Kazuo Horikawa, both of Kanagawa-ken, Japan

[73] Assignee: Fuji Photo Film Co. Ltd., Kanagawa, Japan

[21] Appl. No.: 827,246

[22] Filed: Mar. 28, 1997

[30] Foreign Application Priority Data

Mar. 28, 1996 [JP] Japan .................................. 8-074796

[51] Int. Cl.$^6$ .................................................. G03B 27/32
[52] U.S. Cl. ........................ 347/239; 347/241; 349/2
[58] Field of Search ............................ 347/241, 239, 347/243, 232, 134, 135, 136; 349/2

[56] References Cited

U.S. PATENT DOCUMENTS

| | | | |
|---|---|---|---|
| 4,198,158 | 4/1980 | Knowlton | 347/256 |
| 5,047,789 | 9/1991 | Kanayama et al. | 347/241 |
| 5,109,290 | 4/1992 | Imai | 349/2 |

FOREIGN PATENT DOCUMENTS 4-7542  1/1992  Japan .................. G03B 27/52

OTHER PUBLICATIONS

"O plus E" Magazine, Oct. 1994, pp. 90–94.

Primary Examiner—A. A. Mathews
Attorney, Agent, or Firm—Sughrue, Mion, Zinn, Macpeak & Seas, PLLC

[57] ABSTRACT

An image-wise exposure apparatus comprises a light source for producing recording light, to which a photosensitive material is to be exposed, and a spatial modulation device, which is provided with an array of picture elements and carries out spatial modulation of the recording light. A shifting device changes the optical relationship between the spatial modulation device and the photosensitive material. In cases where the number of exposure dots formed on the photosensitive material is increased by a factor of m with a picture element shifting step carried out with respect to a certain array direction of the picture elements, and the period, with which periodical nonuniformity in image density obtained by exposure occurs with respect to the array direction of the picture elements when the shifting step is not carried out, is n times as long as the pitch between the picture elements, the distance of shift of the picture elements with respect to the array direction of the picture elements is set to be approximately (n±1)/m times as long as the pitch between the picture elements.

10 Claims, 6 Drawing Sheets

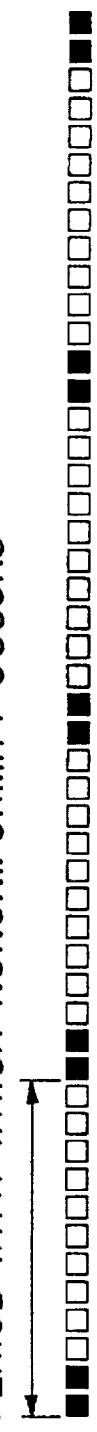
FIG. 2A  SIX PICTURE ELEMENT INTERVAL
FIG. 2B  DISTANCE OF SHIFT OF PICTURE ELEMENTS : 1/2 OF PITCH BETWEEN PICTURE ELEMENTS
PERIOD WITH WHICH NONUNIFORMITY OCCURS
FIG. 2C  DISTANCE OF SHIFT OF PICTURE ELEMENTS : 3.5 TIMES THE PITCH BETWEEN PICTURE ELEMENTS
PERIOD WITH WHICH NONUNIFORMITY OCCURS : APPROX. 1/2

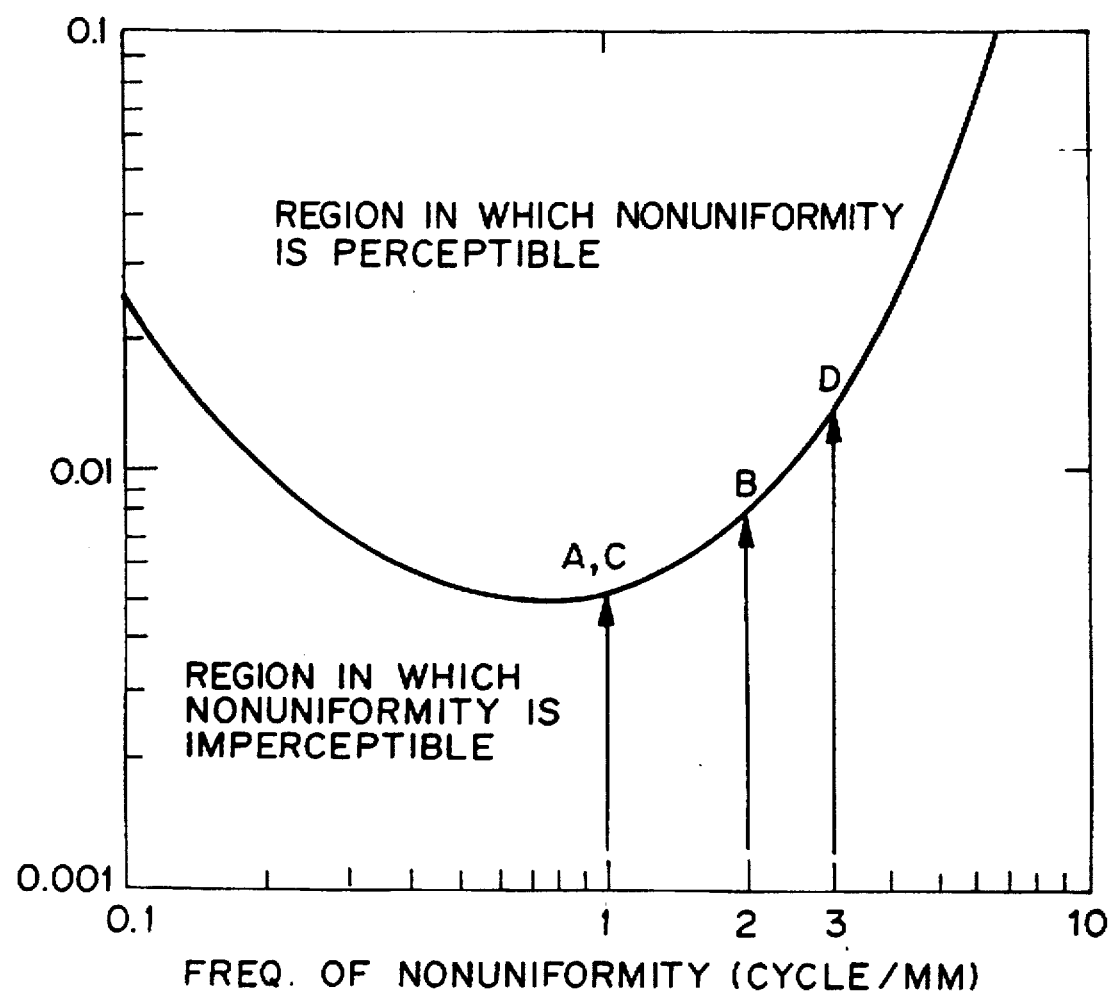

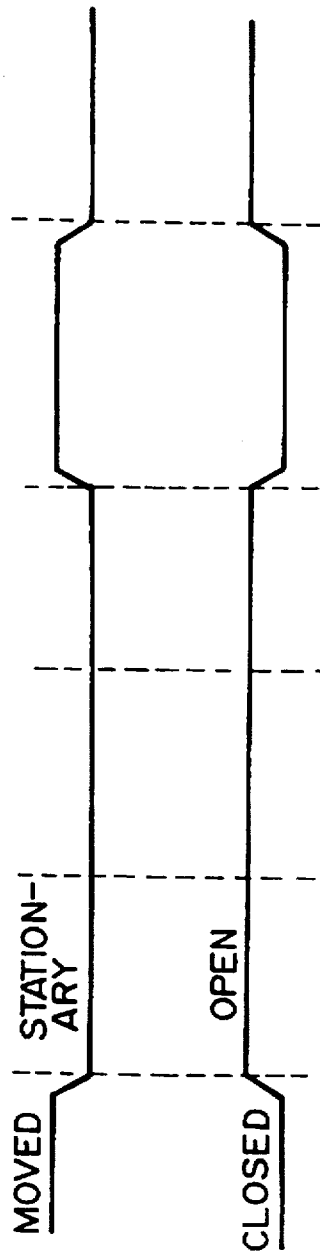
FIG. 4A PAPER CONVEYANCE
FIG. 4B BLACH SHUTTER
FIG. 4C LCD EXPOSURE
FIG. 4D PICTURE ELEMENT SHIFTING
FIG. 4E FILTER CHANGE-OVER

IMAGE-WISE EXPOSURE APPARATUS AND IMAGE DISPLAYING APPARATUS

BACKGROUND OF THE INVENTION

1 Field of the Invention

This invention relates to an image-wise exposure apparatus, wherein a photosensitive material is exposed image-wise by using a spatial modulation device, such as a liquid crystal panel. This invention particularly relates to an image-wise exposure apparatus, wherein a picture element shifting operation is carried out such that a high resolution image may be obtained on the photosensitive material. This invention also relates to an apparatus for displaying an image by using a spatial modulation device, such as a liquid crystal panel, and particularly relates to an image displaying apparatus, wherein a picture element shifting operation is carried out such that a high resolution image may be displayed.

2 Description of the Prior Art

An image-wise exposure apparatus has heretofore been proposed, wherein recording light is modulated by a spatial modulation device, such as a liquid crystal panel, the modulated recording light is irradiated to a photosensitive material, and the photosensitive material is thereby exposed image-wise. Such an image-wise exposure apparatus is described in, for example, Japanese Unexamined Patent Publication No. 4(1992)-7542. Basically, the spatial modulation device comprises a plurality of picture elements (in the cases of the liquid crystal panel, a plurality of liquid crystal cells), the transmittances or the reflectivities of which can be changed, and which are located in the form of a two-dimensional array.

Also, as a spatial modulation device suitable for such an image-wise exposure apparatus, a mirror array device is known, which is described in "O plus E" magazine, the October number, 1994, pp. 90–94. The mirror array device comprises a plurality of small mirrors, which are located in the form of a two-dimensional array, and a driving means for changing the orientations of the respective small mirrors independently. The orientation of each small mirror of the mirror array device is changed such that light incident upon the small mirror may be selectively reflected toward one of two directions.

With the mirror array device described above, in cases where the driving means of the mirror array device is controlled in accordance with an image signal, the light impinging upon a predetermined projection surface via a small mirror can be modulated for each small mirror, and the image can be projected onto the projection surface. Also, in cases where a photosensitive material is located along the projection surface, the photosensitive material can be exposed image-wise. In such cases, the amount of light impinging upon the photosensitive material can be controlled for each small mirror by, for example, carrying out pulse width modulation of the on time of each small mirror (i.e., the time during which each small mirror is set in the orientation that causes the light to impinge upon the photosensitive material) within a frame period. In this manner, a gradation image can be formed on the photosensitive material.

It has been proposed that, in cases where a photosensitive material is exposed image-wise by utilizing a spatial modulation device, such as a liquid crystal panel, the so-called "picture element shifting" technique may be utilized in order to increase the density of picture elements of the formed image and thereby to obtain a high resolution image. As described in, for example, Japanese Unexamined Patent Publication No. 4(1992)-7542, with the picture element shifting technique, the optical relationship between the spatial modulation device and the photosensitive material is changed such that, after exposure dots have been formed on the photosensitive material by the light having passed through the picture elements of the spatial modulation device (e.g., in the cases of the liquid crystal panel, the liquid crystal cells), exposure dots may further be formed between adjacent exposure dots by the light having passed through the picture elements of the spatial modulation device. Also, the image-wise exposure is carried out each time the optical relationship is changed.

As for the image formed by the image-wise exposure, the aforesaid exposure dots constitute the picture elements of the formed image. In this specification, such that the picture elements of the formed image may be discriminated from the picture elements of the spatial modulation device, unless otherwise specified, the picture elements of the formed image are referred to as the exposure dots.

For example, the spatial modulation device may comprise i number of picture elements, which are arrayed along an X direction, and j number of picture elements, which are arrayed along a Y direction. In such cases, if the picture element shifting operation is carried out one time along the X direction and one time along the Y direction, 2i number of exposure dots will be recorded along the X direction on the photosensitive material, and 2j number of exposure dots will be recorded along the Y direction on the photosensitive material. Specifically, in such cases, it is possible to record the same number of exposure dots as that of the exposure dots, which will be recorded when the image-wise exposure is carried out one time by using a spatial modulation device comprising 4(i×j) number of picture elements. Therefore, the resolution of the image formed on the photosensitive material can be increased.

In order to change the optical relationship between the spatial modulation device and the photosensitive material in the manner described above, the spatial modulation device may be moved. Alternatively, the photosensitive material may be moved. As another alternative, an optical member located between the spatial modulation device and the photosensitive material may be moved.

Ordinarily, in the cases of the spatial modulation device, such as the liquid crystal panel, it is difficult to integrate a large number of picture elements at a high density. However, if the aforesaid picture element shifting technique is employed, a high-density image can be formed with the image-wise exposure by using a spatial modulation device, which comprises a comparatively small number of picture elements located at a comparatively low density.

Also, image displaying apparatuses have heretofore been known, in which light having passed through a spatial modulation device, such as a liquid crystal panel or a mirror array device, is projected onto an image displaying surface. The aforesaid picture element shifting technique is applicable also to such image displaying apparatuses.

In the image obtained by exposure with the image-wise exposure apparatus utilizing the spatial modulation device, such as the liquid crystal panel, periodical nonuniformity in image density obtained by exposure often occurs along a certain picture element array direction of the spatial modulation device. For reasons of the visual characteristics of persons, the periodical nonuniformity in image density obtained by exposure is most perceptible when the spatial frequency is equal to approximately 1 cycle/mm.

Ordinarily, the periodical nonuniformity in image density obtained by exposure occurs in cases where n number (where $2 \leq n$) of picture elements in a single row of picture elements of the spatial modulation device are driven in parallel. Specifically, in such cases, n number of signal input lines are laid in parallel. Even if the characteristics of amplifying circuits, digital-to-analog converters, and the like, for the respective lines are adjusted as sufficiently as possible, the characteristics will be apt to become nonuniform. Therefore, a difference in signal level occurs among the n number of signal input lines. For example, in cases where six picture elements in a single horizontal row of picture elements of the spatial modulation device are driven in parallel, if the signal level of one of the six signal input lines becomes markedly higher than the signal levels of the other input lines, nonuniformity in image density, which is repeated periodically at intervals of six picture elements along the horizontal direction and extends along the vertical direction, will occur in the image obtained by exposure.

For the same reasons, periodical nonuniformity in displayed image density often occurs also when the image is displayed with the image displaying apparatus utilizing the spatial modulation device.

SUMMARY OF THE INVENTION

The primary object of the present invention is to provide an image-wise exposure apparatus, wherein an image, in which periodical nonuniformity in image density obtained by exposure is not perceptible, is obtained by exposure.

Another object of the present invention is to provide an image displaying apparatus, wherein an image, in which periodical nonuniformity in displayed image density is not perceptible, is obtained.

The present invention provides an image-wise exposure apparatus, comprising:

i) a light source for producing recording light, to which a photosensitive material is to be exposed, ii) a spatial modulation device provided with:
   a) a plurality of picture elements, the transmittances or the reflectivities of which are capable of being changed, and which are located in the form of an array and at positions that receive the recording light, and
   b) a driving means for changing the transmittances or the reflectivities of the respective picture elements, the spatial modulation device controlling the impingement of the incident recording light upon the photosensitive material, the control being carried out for each of the picture elements, and iii) a picture element shifting means for changing the optical relationship between the spatial modulation device and the photosensitive material such that, after exposure dots have been formed on the photosensitive material by the recording light having passed through the plurality of the picture elements of the spatial modulation device, exposure dots may further be formed between the adjacent exposure dots by the recording light having passed through the picture elements of the spatial modulation device, wherein, in cases where the number of the exposure dots is increased by a factor of m as a result of a picture element shifting step, which is carried out with respect to a certain array direction of the picture elements of the spatial modulation device, and the period, with which periodical nonuniformity in image density obtained by exposure occurs with respect to the certain array direction of the picture elements of the spatial modulation device when the picture element shifting step is not carried out, is n times as long as the pitch between the picture elements of the spatial modulation device, the picture element shifting means operates such that the distance of shift of the picture elements with respect to the certain array direction of the picture elements of the spatial modulation device may be approximately $(n \pm 1)/m$ times as long as the pitch between the picture elements of the spatial modulation device.

In cases where the picture element shifting step is carried out one time, the factor of increase m in the number of the exposure dots by the picture element shifting step, which is carried out with respect to the certain array direction of the picture elements of the spatial modulation device, is equal to 2. In cases where the picture element shifting step is carried out two times, the factor of increase m in the number of the exposure dots is equal to 3. Thus when the number of times of the picture element shifting step is increased by one, the factor of increase m in the number of the exposure dots increases by one.

In the image-wise exposure apparatus in accordance with the present invention, the spatial modulation device may be constituted such that its picture elements arrayed along the certain array direction of the picture elements may be classified into groups, each group being composed of n number of picture elements, and the n number of picture elements constituting each group may be driven in parallel.

Also, in the image-wise exposure apparatus in accordance with the present invention, the spatial frequency of the periodical nonuniformity in image density obtained by exposure, which periodical nonuniformity occurs when the picture element shifting step is not carried out, may be approximately 1 cycle/mm.

Further, in the image-wise exposure apparatus in accordance with the present invention, the spatial modulation device may be constituted such that its picture elements may be arrayed in the form of a two-dimensional array.

Furthermore, in the image-wise exposure apparatus in accordance with the present invention, the spatial modulation device may be constituted such that its picture elements may be arrayed in the form of a one-dimensional array.

The present invention also provides an image displaying apparatus, comprising:

i) a light source for producing displaying light, which travels to an image displaying surface, ii) a spatial modulation device provided with:
   a) a plurality of picture elements, the transmittances or the reflectivities of which are capable of being changed, and which are located in the form of an array and at positions that receive the displaying light, and
   b) a driving means for changing the transmittances or the reflectivities of the respective picture elements, the spatial modulation device controlling the impingement of the incident displaying light upon the image displaying surface, the control being carried out for each of the picture elements, and iii) a picture element shifting means for changing the optical relationship between the spatial modulation device and the image displaying surface such that, after displayed dots have been formed on the image displaying surface by the displaying light having passed through the plurality of the picture elements of the spatial modulation device, displayed dots may further be formed between the adjacent displayed dots by the displaying light having passed through the picture elements of the spatial modulation device, wherein, in cases where the number of the display dots is increased by a factor of m as a result of a picture element shifting step, which is carried out with respect to a certain array direction of the picture elements of the spatial modulation device, and the period, with which periodical nonuniformity in displayed image density occurs with respect to the certain array direction of the picture elements of the spatial modulation device when the picture element shifting step is not carried out, is n times as long as the pitch between the picture elements of the spatial modulation device, the picture element shifting means operates such that the distance of shift of the picture elements with respect to the certain array direction of the picture elements of the spatial modulation device may be approximately $(n\pm1)/m$ times as long as the pitch between the picture elements of the spatial modulation device.

In the image displaying apparatus in accordance with the present invention, the image displaying surface may be located at a position spaced apart from the spatial modulation device or may be combined integrally with the spatial modulation device.

In the image displaying apparatus in accordance with the present invention, the spatial modulation device may be constituted such that its picture elements arrayed along the certain array direction of the picture elements may be classified into groups, each group being composed of n number of picture elements, and the n number of picture elements constituting each group may be driven in parallel.

Also, in the image displaying apparatus in accordance with the present invention, the spatial frequency of the periodical nonuniformity in displayed image density, which periodical nonuniformity occurs when the picture element shifting step is not carried out, may be approximately 1 cycle/mm.

Further, in the image displaying apparatus in accordance with the present invention, the spatial modulation device may be constituted such that its picture elements may be arrayed in the form of a two-dimensional array.

Furthermore, in the image displaying apparatus in accordance with the present invention, the spatial modulation device may be constituted such that its picture elements may be arrayed in the form of a one-dimensional array.

With the conventional image-wise exposure apparatus, the picture element shifting step is ordinarily carried out such that the distance of shift of the picture elements may be equal to the minimum value. Specifically, in cases where the picture element shifting step is carried out, for example, one time with respect to a certain array direction of the picture elements of the spatial modulation device (the factor of increase m in the number of the exposure dots=2), the distance of shift of the picture elements is set to be ½ of the pitch between the picture elements of the spatial modulation device. In such cases, in the image obtained by exposure, the exposure dots, at which the image density obtained by exposure becomes markedly high or markedly low due to nonuniformity in the characteristics of the signal input lines for driving the picture elements of the spatial modulation device in parallel, or the like, occur at positions adjacent to each other.

FIGS. 2A and 2B are explanatory views showing the problems described above. In FIG. 2A, square marks indicate the picture elements of the spatial modulation device, which are arrayed along a certain direction. In FIG. 2A, each of black square marks indicates a picture element connected to a single signal input line, which has characteristics different from the other five signal input lines among six signal input lines for driving the six picture elements of the spatial modulation device in parallel. The transmittance of the picture element indicated by the black square mark is markedly higher than the transmittances of the other picture elements. In FIG. 2B, square marks indicate the exposure dots in an image obtained by exposure, which are obtained by using the spatial modulation device having the picture elements shown in FIG. 2A and by carrying out a picture element shifting step such that the distance of shift of the picture elements may be ½ of the pitch between the picture elements of the spatial modulation device in accordance with the conventional image-wise exposure apparatus. In FIG. 2B, each of black square marks indicates an exposure dot, which has a markedly high image density due to the aforesaid picture element having the markedly high transmittance.

As will be understood from FIGS. 2A and 2B, with the conventional image-wise exposure apparatus, the period, with which the periodical nonuniformity in image density obtained by exposure occurs when the picture element shifting step is carried out, is identical with the period, with which the periodical nonuniformity in image density obtained by exposure occurs when the picture element shifting step is not carried out. Therefore, if the spatial frequency of the periodical nonuniformity in image density obtained by exposure, which periodical nonuniformity occurs when the picture element shifting step is not carried out, is equal to, for example, approximately 1 cycle/mm, and therefore the periodical nonuniformity is very perceptible, the periodical nonuniformity in image density obtained by exposure, which periodical nonuniformity occurs in the image obtained by carrying out the picture element shifting step, will become very perceptible.

With the image-wise exposure apparatus in accordance with the present invention, the distance of shift of the picture elements with respect to the array direction of the picture elements of the spatial modulation device is set to be approximately $(n\pm1)/m$ times as long as the pitch between the picture elements of the spatial modulation device. Therefore, in the image obtained by carrying out the picture element shifting step, the exposure dots, at which the image density obtained by exposure becomes markedly high or markedly low due to nonuniformity in the characteristics of the signal input lines for driving the picture elements of the spatial modulation device in parallel, or the like, occur at positions that are not adjacent to each other, and the period, with which such exposure dots occur, becomes short. Specifically, in the example described above, n=6 and m=2. Therefore, with the image-wise exposure apparatus in accordance with the present invention, the distance of shift of the picture elements is set to be 3.5 times as long as the pitch between the picture elements of the spatial modulation device. As a result, the exposure dots in the image obtained by exposure occur in the state shown in FIG. 2C. As illustrated in FIG. 2C, the period, with which the exposure dots having a markedly high image density occur when the picture element shifting step is carried out in accordance with the present invention, becomes approximately equal to ½ of the period, with which the periodical nonuniformity in image density obtained by exposure occurs when the picture element shifting step is not carried out. (The spatial frequency of the periodical nonuniformity in image density obtained by exposure, which periodical nonuniformity occurs when the picture element shifting step is carried out in accordance with the present invention, becomes approximately two times as high as the spatial frequency of the periodical nonuniformity in image density obtained by exposure, which periodical nonuniformity occurs when the picture element shifting step is not carried out.)

FIG. 3 is a graph showing a perceptible region of periodical nonuniformity in image density obtained by exposure, the perceptible region being determined with respect to an optical density difference of the periodical nonuniformity and a spatial frequency of the periodical nonuniformity. (The results of determination are described in collected papers of the Third Nonimpact Printing Technology Symposium, pp. 101-104.) As illustrated in FIG. 3, as the spatial frequency of the periodical nonuniformity in image density obtained by exposure becomes higher than the value, i.e. approximately 1 cycle/mm, at which the periodical nonuniformity is most perceptible, the periodical nonuniformity becomes less perceptible.

Therefore, with the image-wise exposure apparatus in accordance with the present invention, in cases where the periodical nonuniformity in image density obtained by exposure, which periodical nonuniformity occurs when the picture element shifting step is not carried out, is perceptible, the periodical nonuniformity in image density obtained by exposure in the image, which is obtained by carrying out the picture element shifting step, becomes imperceptible by virtue of an increase in the spatial frequency of the periodical nonuniformity.

With the image displaying apparatus in accordance with the present invention, in lieu of the photosensitive material being exposed image-wise to the spatially modulated recording light in the image-wise exposure apparatus in accordance with the present invention, the spatially modulated displaying light is projected onto the image displaying surface, and the image is thereby displayed on the image displaying surface. The change in the spatial frequency of the periodical nonuniformity in displayed image density due to the picture element shifting step in the image displaying apparatus in accordance with the present invention is basically the same as that in the image-wise exposure apparatus in accordance with the present invention. Therefore, with the image displaying apparatus in accordance with the present invention, the periodical nonuniformity in displayed image density becomes imperceptible by the same effects as those described above.

BRIEF DESCRIPTION OF THE DRAWINGS

FIG. 2A is an explanatory view showing picture elements of a spatial modulation device, which are arrayed along a certain direction, FIG. 2B is an explanatory view showing the relationship between a distance of shift of picture elements, which is set in a conventional image-wise exposure apparatus, and a period, with which periodical nonuniformity in image density obtained by exposure occurs, FIG. 2C is an explanatory view showing the relationship between a distance of shift of picture elements, which is set in the embodiment of the image-wise exposure apparatus in accordance with the present invention, and a period, with which periodical nonuniformity in image density obtained by exposure occurs, FIG. 3 is a graph showing a perceptible region of periodical nonuniformity in image density obtained by exposure, the perceptible region being determined with respect to an optical density difference of the periodical nonuniformity and a spatial frequency of the periodical nonuniformity, FIGS. 4A, 4B, 4C, 4D, and 4E are timing charts showing the timings, with which the respective operations in the embodiment of FIG. 1 are carried out.

DESCRIPTION OF THE PREFERRED EMBODIMENTS

The present invention will hereinbelow be described in further detail with reference to the accompanying drawings.

Figure 1:
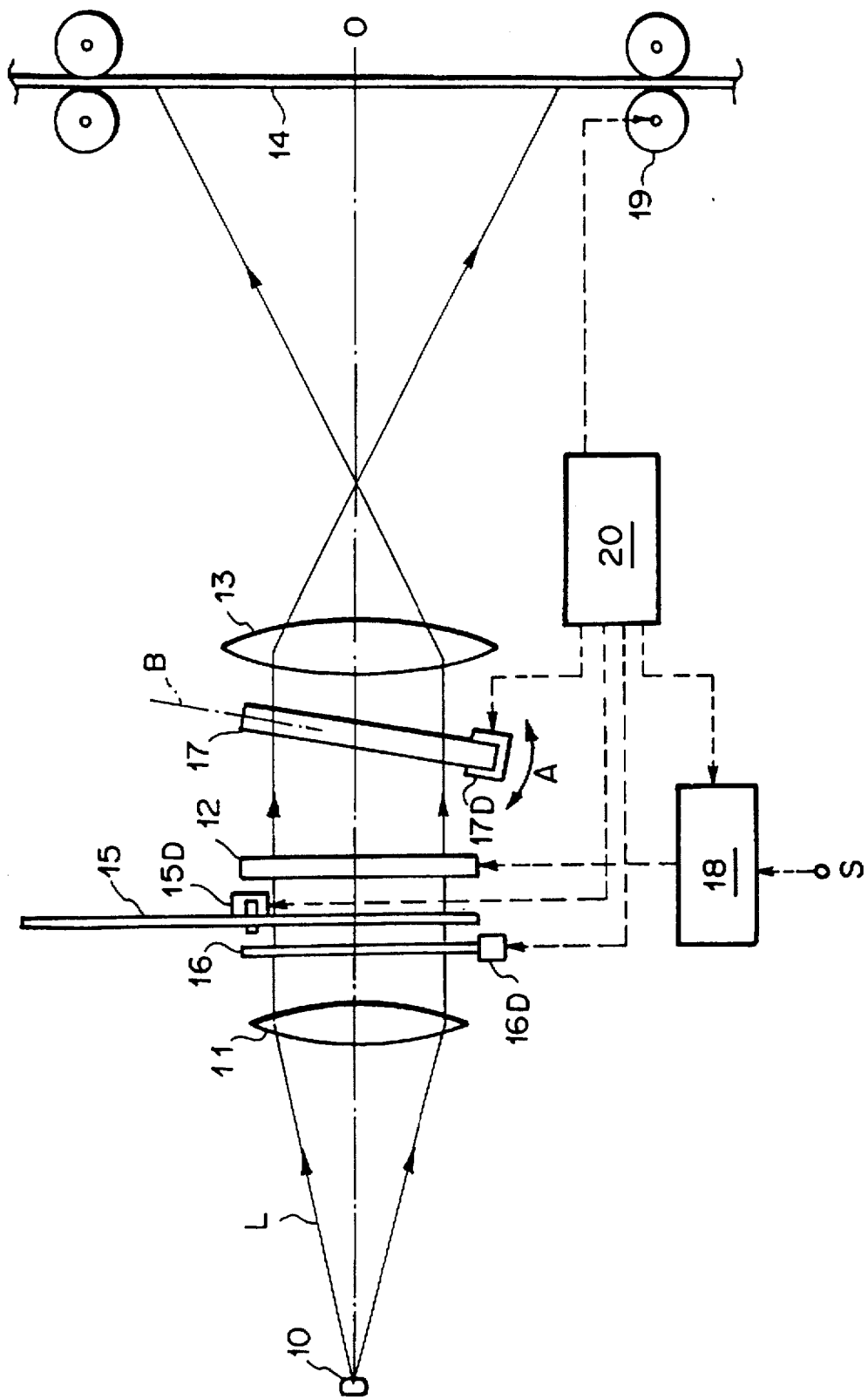
FIG. 1 is a side view showing an embodiment of the image-wise exposure apparatus in accordance with the present invention.

FIG. 1 shows an embodiment of the image-wise exposure apparatus in accordance with the present invention. As illustrated in FIG. 1, the image-wise exposure apparatus comprises a light source 10 for producing recording light L, to which a color photosensitive material 14 is to be exposed, and a converging lens 11, which is located such that the light source 10 may be located in the vicinity of the focal point of the converging lens 11 and which collimates the recording light L having been produced by the light source 10. The image-wise exposure apparatus also comprises a liquid crystal display panel 12, which comprises a plurality of TN liquid crystal cells, or the like, located in the form of a two-dimensional array and which is located in an orientation such that it may be approximately normal to the optical axis O of the converging lens 11. The image-wise exposure apparatus further comprises an image forming lens 13 located at the position upon which the recording light L having passed through the liquid crystal display panel 12 impinges. The image-wise exposure apparatus still further comprises a color filter 15 and a black shutter 16, which are inserted into the optical path of the recording light L at positions upstream from the liquid crystal display panel 12. Also, a plane-parallel plate 17 for carrying out a picture element shifting operation is located between the liquid crystal display panel 12 and the image forming lens 13.

By way of example, the light source 10 is constituted of a halogen lamp for producing white light and is located such that the center point of the filament of the halogen lamp may be located on the optical axis 0 of the converging lens 11. The black shutter 16 is driven by a driving means 16D and selectively takes the condition inserted into the optical path of the recording light L or the condition retracted from it. The plane-parallel plate 17 is swung in directions, which are indicated by the double headed arrow A in FIG. 1, and in a direction of rotation around an axis B.

The liquid crystal display panel 12 is driven by a driving circuit 18, which receives an image signal S representing a gradation image. The liquid crystal display panel 12 carries out spatial modulation of the recording light L and displays the gradation image. Specifically, a voltage in accordance with the image signal S is applied from the driving circuit 18 to each of the plurality of the liquid crystal cells of the liquid crystal display panel 12, which are located in the form of the two-dimensional array. The transmittance of each liquid crystal cell with respect to the recording light L is changed in accordance with the value of the applied voltage, and the gradation image is thereby displayed on the liquid crystal display panel 12.

The image forming lens 13 forms the gradation image, which has thus been displayed on the liquid crystal display panel 12, on the color photosensitive material 14. The color photosensitive material 14 is thereby exposed image-wise. In this embodiment, the color photosensitive material 14 is constituted of long color photographic paper (color paper) and is moved intermittently by a distance equal to the length of a single frame on the color photosensitive material 14. The color photosensitive material 14 is moved by the conveyance means 19.

The color filter 15 is provided with a B (blue) filter, a G (green) filter, and an R (red) filter. The B (blue), G (green), and R (red) filters are sequentially inserted into the optical path of the recording light L by a driving means 15D. While one of the B (blue), G (green), and R (red) filters is being inserted into the optical path of the recording light L, the liquid crystal display panel 12 is driven in accordance with the color image signal corresponding to the color of the inserted filter. At the time at which the filter inserted into the optical path of the recording light L is changed over among the B (blue), G (green), and R (red) filters, all of the picture elements of the liquid crystal display panel 12 are set to the condition blocked from the recording light L. In the manner described above, the color photosensitive material 14 is sequentially exposed to the blue light, the green light, and the red light, which have been modulated. A color photographic latent image is thereby recorded on the color photosensitive material 14.

The operations of the driving means 15D, the driving means 16D, the driving means 17D, the driving circuit 18, and the conveyance means 19 are controlled by a control circuit 20 such that the operations may be synchronized with one another. FIGS. 4A through 4E show the timings, with which the processes in accordance with these operations, i.e. change-over of the color filter and the picture element shifting operation, which will be described later, and the like, are carried out.

Figure 5A:
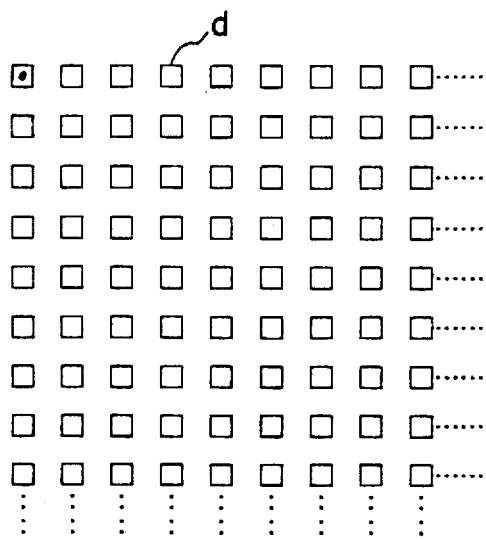
FIG. 5A, 5B, 5C, and 5D are explanatory views showing how a picture element shifting operation is carried out in the embodiment of FIG. 1, and FIGS. 6A and 6B are explanatory views showing how the periodical nonuniformity in image density obtained by exposure occurs in the embodiment of FIG. 1.

How the picture element shifting operation is carried out will be described hereinbelow. While one of the B (blue), G (green), and R (red) filters is being inserted into the optical path of the recording light L, the plane-parallel plate 17 is set to four different orientations. Each time the plane-parallel plate 17 is set to one of the four different orientations, image-wise exposure is carried out in accordance with the color image signal corresponding to the color of the filter, which is being inserted into the optical path of the recording light L. Specifically, for example, while the B (blue) filter is being inserted into the optical path of the recording light L, the plane-parallel plate 17 is kept at a first position, and the liquid crystal display panel 12 is driven in this condition. At this time, the liquid crystal display panel 12 is driven in accordance with the blue image signal, which represents the picture elements at odd-numbered rows and odd-numbered columns in the array of picture elements of the image to be formed. As a result, as illustrated in FIG. 5A, exposure dots d indicated schematically by square marks are recorded on the color photosensitive material 14.

In FIGS. 5A, 5B, 5C, and 5D, the exposure dots d, which are indicated by the square marks with black dots, represent the exposure dots, which are recorded with the recording light L having passed through a single specific picture element of the liquid crystal display panel 12. How the picture element shifting operation is carried out will be understood easily by following the exposure dots d, which are indicated by the square marks with black dots, in FIGS. 5A, 5B, 5C, and 5D.

Figure 5B:
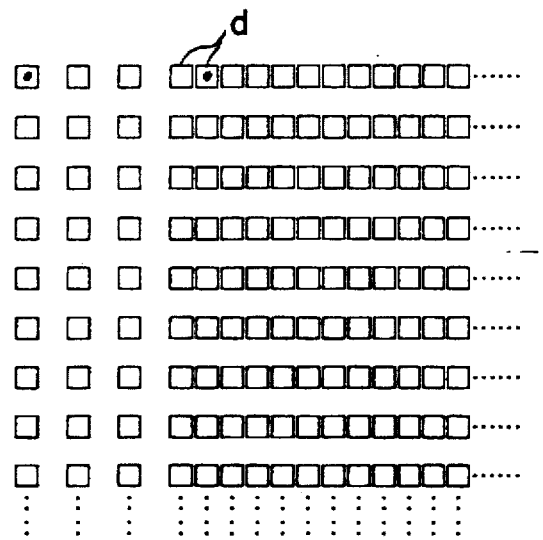

Thereafter, the plane-parallel plate 17 is swung by a predetermined angle toward one of the directions indicated by the double headed arrow A in FIG. 1 and is thereby located at a second position. In this condition, the liquid crystal display panel 12 is driven. At this time, the liquid crystal display panel 12 is driven in accordance with the blue image signal, which represents the picture elements at odd-numbered rows and even-numbered columns in the array of picture elements of the image to be formed. As a result, as illustrated in FIG. 5B, new exposure dots d, each of which is embedded between two adjacent exposure dots d having already been recorded, are recorded on the color photosensitive material 14.

In this manner, in this embodiment, the picture element shifting operation is carried out by moving the plane-parallel plate 17. In the picture element shifting step, which is carried out by moving the plane-parallel plate 17 to the second position in the manner described above, the picture element shifting is carried out with respect to the horizontal direction of the liquid crystal display panel 12. At this time, the distance of shift of the picture elements is set to be 3.5 times as long as the pitch between the picture elements along the horizontal direction of the liquid crystal display panel 12.

Figure 5C:
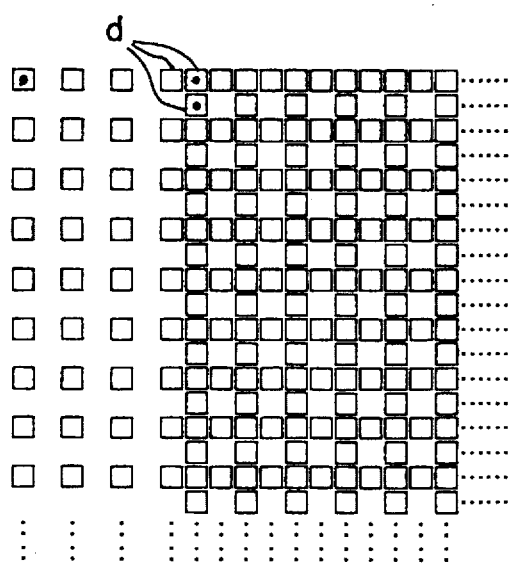

Thereafter, the plane-parallel plate 17 is swung by a predetermined angle around the axis B shown in FIG. 1 and is thereby located at a third position. In this condition, the liquid crystal display panel 12 is driven. At this time, the liquid crystal display panel 12 is driven in accordance with the blue image signal, which represents the picture elements at even-numbered rows and even-numbered columns in the array of picture elements of the image to be formed. As a result, as illustrated in FIG. 5C, new exposure dots d are recorded on the color photosensitive material 14. At this time, the picture element shifting is carried out with respect to the vertical direction of the liquid crystal display panel 12. Also, the distance of shift of the picture elements is set to be 0.5 times as long as the pitch between the picture elements along the vertical direction of the liquid crystal display panel 12.

Figure 5D:
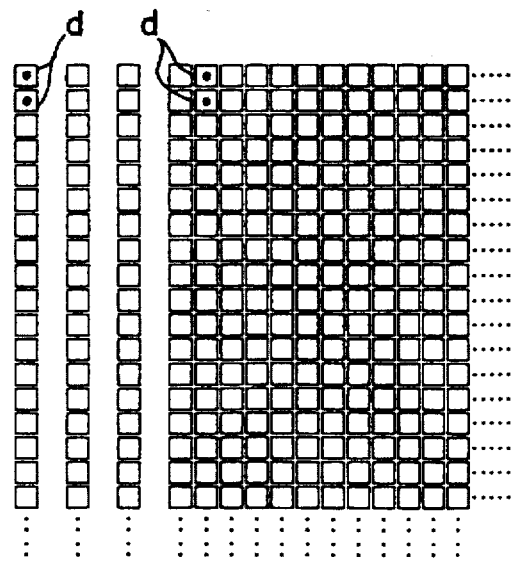

Thereafter, the plane-parallel plate 17 is swung by a predetermined angle toward the reverse direction indicated by the double headed arrow A in FIG. 1 (i.e., toward the direction reverse to the direction, toward which the plane-parallel plate 17 was swung from the first position to the second position) and is thereby located at a fourth position. In this condition, the liquid crystal display panel 12 is driven. At this time, the liquid crystal display panel 12 is driven in accordance with the blue image signal, which represents the picture elements at even-numbered rows and odd-numbered columns in the array of picture elements of the image to be formed. As a result, as illustrated in FIG. 5D, new exposure dots d are recorded on the color photosensitive material 14. At this time, the picture element shifting is carried out with respect to the horizontal direction of the liquid crystal display panel 12. Also, the distance of shift of the picture elements is set to be 3.5 times as long as the pitch between the picture elements along the horizontal direction of the liquid crystal display panel 12.

Thereafter, in lieu of the B (blue) filter, the G (green) filter is inserted into the optical path of the recording light L. While the insertion of the G (green) filter into the optical path is being carried out, the plane-parallel plate 17 is returned to the first position.

In the manner described above, the picture element shifting is carried out one time with respect to each of the picture element array direction X (i.e., the horizontal direction) and the picture element array direction Y (i.e., the vertical direction) of the liquid crystal display panel 12, which array directions intersect perpendicularly to each other. Therefore, with respect to both of the X and Y directions, the number of the exposure dots d, which is two times as large as the number of the picture elements arrayed on the liquid crystal display panel 12, are recorded on the color photosensitive material 14. Accordingly, a high resolution image can be formed on the color photosensitive material 14.

The picture element shifting operation described above is carried out in the same manner as that described above also when each of the G (green) filter and the R (red) filter is inserted into the optical path of the recording light L and the image-wise exposure operation is thereby carried out. Thereafter, the color photosensitive material 14 is subjected to an ordinary developing process, and the latent image having been formed thereon is thereby developed into a visible image.

Figure 6A:
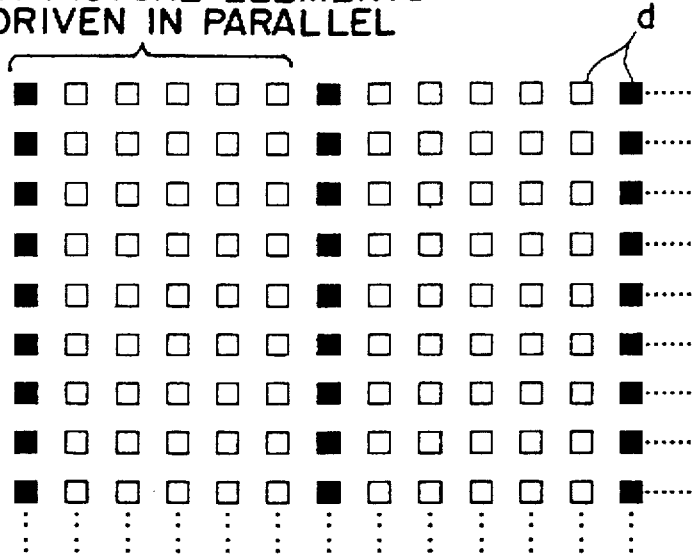
Figure 6B:
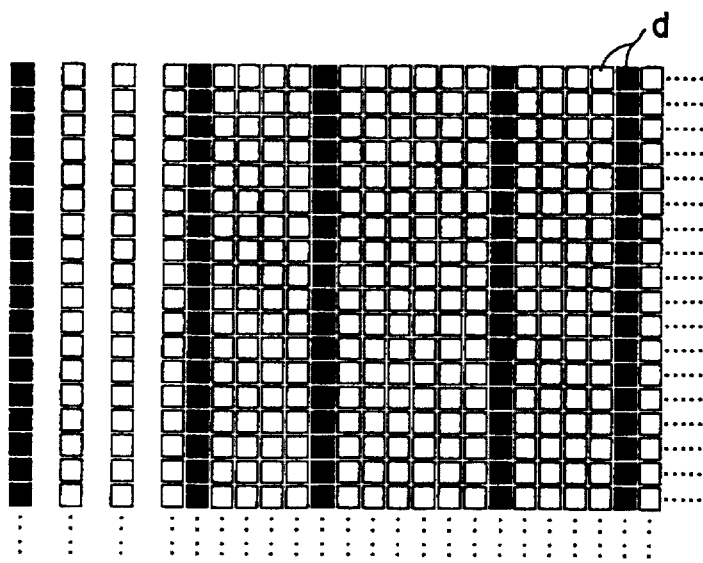

As described above, the liquid crystal display panel 12 is constituted such that six picture elements arrayed along the horizontal direction may be driven in parallel. if, for example, the characteristics of a single signal input line, which is among the six signal input lines for driving the six picture elements of the liquid crystal display panel 12 in parallel, are markedly different from the characteristics of the other five signal input lines, the transmittance of the picture element connected to the single signal input line will become markedly higher than the transmittances of the other five picture elements. In such cases, when the picture element shifting operation is not carried out, an image as shown in FIG. 6A is obtained on the color photosensitive material 14. Specifically, of the exposure dots d indicated by the square marks in FIG. 6A, exposure dots having a markedly high image density (which are indicated by the black square marks in FIG. 6A) occur at a rate of a single exposure dot per six dots arrayed along the horizontal direction. As a result, the periodical nonuniformity in image density, which extends along the vertical direction, occurs in the image. Therefore, in the image obtained by carrying out the picture element shifting operation described above, the periodical nonuniformity in image density obtained by exposure occurs in the pattern shown in FIG. 6B.

Table 1 below shows various specifications of this embodiment of the image-wise exposure apparatus in accordance with the present invention and the conventional image-wise exposure apparatus, the characteristics of the periodical nonuniformity in image density obtained by exposure, and the like. In the "LCD" column of Table 1, the values with respect to the liquid crystal display panel 12 are listed. In the "A", "B", "C", and "D" columns of Table 1, the values with respect to the A4-size image obtained by exposure on the color photosensitive material 14 are listed.

TABLE 1

| Number of lines | | Exposed surface (A4) | | | | |
|---|---|---|---|---|---|---|
| | | LCD | A | B | C | D |
| driven in parallel | | 6 | 6 | 6 | 6 | 6 |
| Number of picture elements | Vertical | 1240 | 2480 | 2480 | 2480 | 2480 |
| | Horizontal | 1754 | 3508 | 3508 | 5262 | 5262 |
| Size | Vertical [mm] | 37.2 | 210 | 210 | 210 | 210 |
| | Horizontal [mm] | 52.62 | 298 | 298 | 298 | 298 |
| Magnification | | 1 | 5.65 | 5.65 | 5.65 | 5.65 |
| Factor of increase in the number of exposure dots | Vertical | | 2 | 2 | 2 | 2 |
| | Horizontal | | 2 | 2 | 3 | 3 |
| Distance of shift of picture elements (times the pitch between picture elements) | Vertical [LCD picture elements] | | 0.5 | 0.5 | 0.5 | 0.5 |
| | Horizontal [LCD picture elements] | | 0.50 | 3.50 | 0.33 | 2.33 |
| Pitch between picture elements | Vertical [mm] | 0.030 | 0.085 | 0.085 | 0.085 | 0.085 |
| | Horizontal [mm] | 0.030 | 0.085 | 0.085 | 0.057 | 0.057 |
| Period with which nonuniformity occurs | Horizontal [mm] | 0.18 | 1.02 | 0.51 | 1.02 | 0.34 |
| Frequency of nonuniformity | Horizontal [cycle/mm] | 5.56 | 0.98 | 1.97 | 0.98 | 2.95 |

In Table 1, in the "B" column, the values with respect to the image obtained by exposure with this embodiment of the image-wise exposure apparatus in accordance with the present invention are listed. Also, as a comparative example, in the "A" column, the values, which are obtained when the distance of shift of the picture elements with respect to each of the horizontal and vertical directions is set to be 0.5 times as long as the pitch between the picture elements, are listed. As listed in the "A" column, in cases where the distance of shift of the picture elements with respect to the horizontal direction is set to be 0.5 times as long as the pitch between the picture elements, the spatial frequency of the periodical nonuniformity in image density obtained by exposure is 0.98 cycle/mm, and therefore, as described above, the periodical nonuniformity in image density obtained by exposure is markedly perceptible by the human eyes.

With the embodiment of the image-wise exposure apparatus in accordance with the present invention, as listed in the "B" column, the distance of shift of the picture elements with respect to the horizontal direction is set to be 3.5 times as long as the pitch between the picture elements. Therefore, the spatial frequency of the periodical nonuniformity in image density obtained by exposure is 1.97 cycles/mm. As will be clear from FIG. 3, the periodical nonuniformity in image density obtained by exposure, which has this level of spatial frequency, is imperceptible by the human eyes.

In this embodiment, the number of the exposure dots is increased by a factor of m=2 as a result of the picture element shifting step, which is carried out with respect to the horizontal direction. Also, the period, with which the periodical nonuniformity in image density obtained by exposure occurs with respect to the horizontal direction when the picture element shifting step is not carried out, is six (n=6) times as long as the pitch between the picture elements. Therefore, the distance of shift of the picture elements with respect to the horizontal direction is set to be 3.5 times as long as the pitch between the picture elements. The value of 3.5 is calculated with the formula, (n+1)/m=(6+1)/2=3.5.

In this embodiment, as described above, with respect to only the horizontal direction, the distance of shift of the picture elements is set to be 3.5 times as long as the pitch between the picture elements. Alternatively, with respect to both of the horizontal and vertical directions, the distance of shift of the picture elements may be set to be 3.5 times as long as the pitch between the picture elements. As another alternative, with respect to only the vertical direction, the distance of shift of the picture elements may be set to be 3.5 times as long as the pitch between the picture elements.

In the embodiment described above, the factor of increase in the number of the exposure dots, which increase is effected by the picture element shifting step, is equal to 2 with respect to both of the horizontal and vertical directions. In case where the factor of increase in the number of the exposure dots, which increase is effected by the picture element shifting step, is 3 with respect to the horizontal direction and is 2 with respect to the vertical direction, the values listed in the "C" and "D" columns of Table 1 are obtained.

In the "C" column, the values, which are obtained when the distance of shift of the picture elements with respect to the horizontal direction is set to be 0.33 times as long as the pitch between the picture elements, and the distance of shift of the picture elements with respect to the vertical direction is set to be 0.5 times as long as the pitch between the picture elements, are listed. In the "D" column, the values, which are obtained when the distance of shift of the picture elements with respect to the horizontal direction is set to be 2.33 times as long as the pitch between the picture elements, and the distance of shift of the picture elements with respect to the vertical direction is set to be 0.5 times as long as the pitch between the picture elements, are listed.

Specifically, in the cases of the "D" column, the number of the exposure dots is increased by a factor of m=3 as a result of the picture element shifting step, which is carried out with respect to the horizontal direction. Also, the period, with which the periodical nonuniformity in image density obtained by exposure occurs with respect to the horizontal direction when the picture element shifting step is not carried out, is six (n=6) times as long as the pitch between the picture elements. Therefore, the distance of shift of the picture elements with respect to the horizontal direction is set to be 2.33 times as long as the pitch between the picture elements. The value of 2.33 is calculated with the formula, (n+1)/m=(6+1)/3=2.33.

In the cases of the "C" column, as in the cases of the "A" column, the spatial frequency of the periodical nonuniformity in image density obtained by exposure is 0.98 cycle/mm. As described above, the periodical nonuniformity in image density obtained by exposure, which has this level of spatial frequency, is markedly perceptible by the human eyes. On the other hand, in the cases of the "D" column, the spatial frequency of the periodical nonuniformity in image density obtained by exposure is 2.95 cycles/mm. The periodical nonuniformity in image density obtained by exposure, which has this level of spatial frequency, is imperceptible by the human eyes.

In the embodiment described above, the liquid crystal display panel 12 is employed as the spatial modulation device. Alternatively, as the spatial modulation device, a mirror array device, a PLZT shutter array, or the like, may be employed. Also, there has heretofore been known an image-wise exposure apparatus, wherein a liquid crystal display panel having a plurality of picture elements located in the form of a one-dimensional array, a mirror array device, a PLZT shutter array, or the like, is employed as the spatial modulation device, and wherein sub-scanning is carried out with movement of the photosensitive material relative to the spatial modulation device. The image-wise exposure apparatus in accordance with the present invention is also applicable to such a type of image-wise exposure apparatus.

Further, in the embodiment described above, the color image exposure is carried out by changing over the color filter. The image-wise exposure apparatus in accordance with the present invention is also applicable when three-color recording light beams are respectively subjected to spatial modulation with three independent spatial modulation devices, the modulated recording light beams are irradiated simultaneously to the photosensitive material, and the photosensitive material is thereby exposed image-wise.

Furthermore, in the constitution illustrated in FIG. 1, a projection screen serving as an image displaying surface may be located in lieu of the color photosensitive material 14. In this manner, an embodiment of the image displaying apparatus in accordance with the present invention may be constituted. With the embodiment of the image displaying apparatus in accordance with the present invention, wherein the distance of shift of the picture elements is set be approximately (n±1)/m times as long as the pitch between the picture elements, the periodical nonuniformity in displayed image density can be rendered imperceptible.

What is claimed is:

1. An image-wise exposure apparatus, comprising:
   i) a light source for producing recording light, to which a photosensitive material is to be exposed,
   ii) a spatial modulation device provided with:
      a) a plurality of picture elements, the transmittances or the reflectivities of which are capable of being changed, and which are located in the form of an array and at positions that receive the recording light, and
      b) a driving means for changing the transmittances or the reflectivities of the respective picture elements,
   the spatial modulation device controlling the impingement of the incident recording light upon the photosensitive material, the control being carried out for each of the picture elements, and
   iii) a picture element shifting means for changing the optical relationship between the spatial modulation device and the photosensitive material such that, after exposure dots have been formed on the photosensitive material by the recording light having passed through the plurality of the picture elements of the spatial modulation device, exposure dots may further be formed between the adjacent exposure dots by the recording light having passed through the picture elements of the spatial modulation device,
   wherein, in cases where the number of the exposure dots is increased by a factor of m as a result of a picture element shifting step, which is carried out with respect to a certain array direction of the picture elements of the spatial modulation device, and the period, with which periodical nonuniformity in image density obtained by exposure occurs with respect to said certain array direction of the picture elements of the spatial modulation device when said picture element shifting step is not carried out, is n times as long as the pitch between the picture elements of the spatial modulation device, the picture element shifting means operates such that the distance of shift of the picture elements with respect to said certain array direction of the picture elements of the spatial modulation device may be approximately $(n\pm1)/m$ times as long as the pitch between the picture elements of the spatial modulation device.

2. An image-wise exposure apparatus as defined in claim 1 wherein the spatial modulation device is constituted such that its picture elements arrayed along said certain array direction of the picture elements may be classified into groups, each group being composed of n number of picture elements, and the n number of picture elements constituting each group may be driven in parallel.

3. An image-wise exposure apparatus as defined in claim 1 wherein the spatial frequency of the periodical nonuniformity in image density obtained by exposure, which periodical nonuniformity occurs when said picture element shifting step is not carried out, is approximately 1 cycle/mm.

4. An image-wise exposure apparatus as defined in claim 1 wherein the spatial modulation device is constituted such that its picture elements may be arrayed in the form of a two-dimensional array.

5. An image-wise exposure apparatus as defined in claim 1 wherein the spatial modulation device is constituted such that its picture elements may be arrayed in the form of a one-dimensional array.

6. An image displaying apparatus, comprising:

i) a light source for producing displaying light, which travels to an image displaying surface, ii) a spatial modulation device provided with:

a) a plurality of picture elements, the transmittances or the reflectivities of which are capable of being changed, and which are located in the form of an array and at positions that receive the displaying light, and b) a driving means for changing the transmittances or the reflectivities of the respective picture elements, the spatial modulation device controlling the impingement of the incident displaying light upon the image displaying surface, the control being carried out for each of the picture elements, and iii) a picture element shifting means for changing the optical relationship between the spatial modulation device and the image displaying surface such that, after displayed dots have been formed on the image displaying surface by the displaying light having passed through the plurality of the picture elements of the spatial modulation device, displayed dots may further be formed between the adjacent displayed dots by the displaying light having passed through the picture elements of the spatial modulation device, wherein, in cases where the number of the displayed dots is increased by a factor of m as a result of a picture element shifting step, which is carried out with respect to a certain array direction of the picture elements of the spatial modulation device, and the period, with which periodical nonuniformity in displayed image density occurs with respect to said certain array direction of the picture elements of the spatial modulation device when said picture element shifting step is not carried out, is n times as long as the pitch between the picture elements of the spatial modulation device, the picture element shifting means operates such that the distance of shift of the picture elements with respect to said certain array direction of the picture elements of the spatial modulation device may be approximately $(n\pm1)/m$ times as long as the pitch between the picture elements of the spatial modulation device.

7. An image displaying apparatus as defined in claim 6 wherein the spatial modulation device is constituted such that its picture elements arrayed along said certain array direction of the picture elements may be classified into groups, each group being composed of n number of picture elements, and the n number of picture elements constituting each group may be driven in parallel.

8. An image displaying apparatus as defined in claim 6 wherein the spatial frequency of the periodical nonuniformity in displayed image density, which periodical nonuniformity occurs when said picture element shifting step is not carried out, is approximately 1 cycle/mm.

9. An image displaying apparatus as defined in claim 6 wherein the spatial modulation device is constituted such that its picture elements may be arrayed in the form of a two-dimensional array.

10. An image displaying apparatus as defined in claim 6 wherein the spatial modulation device is constituted such that its picture elements may be arrayed in the form of a one-dimensional array.

* * * * *